US012627089B2

(12) United States Patent
Yamazaki

(10) Patent No.: US 12,627,089 B2
(45) Date of Patent: May 12, 2026

(54) CONNECTOR AND ELECTRONIC DEVICE

(71) Applicant: KYOCERA CORPORATION, Kyoto (JP)

(72) Inventor: Genta Yamazaki, Sagamihara (JP)

(73) Assignee: KYOCERA CORPORATION, Kyoto (JP)

( * ) Notice: Subject to any disclaimer, the term of this patent is extended or adjusted under 35 U.S.C. 154(b) by 297 days.

(21) Appl. No.: 18/275,581

(22) PCT Filed: Feb. 2, 2022

(86) PCT No.: PCT/JP2022/004121

§ 371 (c)(1),
(2) Date: Aug. 2, 2023

(87) PCT Pub. No.: WO2022/168886

PCT Pub. Date: Aug. 11, 2022

(65) Prior Publication Data

US 2024/0039197 A1 Feb. 1, 2024

(30) Foreign Application Priority Data

Feb. 4, 2021 (JP) ................................ 2021-016954

(51) Int. Cl.
*H01R 12/91* (2011.01)
*H01R 13/424* (2006.01)

(52) U.S. Cl.
CPC .......... *H01R 12/91* (2013.01); *H01R 13/424* (2013.01)

(58) Field of Classification Search
CPC .............................. H01R 13/424; H01R 12/91
USPC ........................................................... 439/78
See application file for complete search history.

(56) References Cited

U.S. PATENT DOCUMENTS

| | | | |
|---|---|---|---|
| 7,862,345 B2 | 1/2011 | Fukazawa et al. | |
| 10,230,187 B2 | 3/2019 | Hasegawa | |
| 10,290,975 B2 * | 5/2019 | Takane | H01R 12/91 |
| 10,483,674 B2 | 11/2019 | Hasegawa | |
| 11,552,419 B2 | 1/2023 | Obata et al. | |
| 2008/0296133 A1 | 12/2008 | Ura | |

(Continued)

FOREIGN PATENT DOCUMENTS

| | | |
|---|---|---|
| EP | 3349309 A1 | 7/2018 |
| JP | 2009230944 A | 10/2009 |

(Continued)

*Primary Examiner* — Tulsidas C Patel
*Assistant Examiner* — Thaslimur Rahman
(74) *Attorney, Agent, or Firm* — Duane Morris LLP

(57) ABSTRACT

A connector includes a first insulator, a second insulator, and a contact. The first insulator is formed in a rectangular shape and includes a pair of first side walls and a bottom wall. The second insulator extends along a longitudinal direction of the first insulator. The second insulator is partially positioned in a space surrounded by the pair of first side walls and the bottom wall and is movable relative to the first insulator. The contact is mounted on the first side walls of the first insulator and on the second insulator and includes an elastic portion. The elastic portion is located between the first insulator and the second insulator and connects the first insulator and the second insulator to each other. The second insulator and the elastic portion are spaced apart from the first insulator and face the bottom wall in a non-fitted state.

14 Claims, 11 Drawing Sheets

(56) References Cited

U.S. PATENT DOCUMENTS

| | | | | |
|---|---|---|---|---|
| 2009/0239422 | A1* | 9/2009 | Fukazawa ............ | H01R 12/716 |
| | | | | 439/660 |
| 2019/0013608 | A1* | 1/2019 | Yoshida ............... | H01R 13/631 |

FOREIGN PATENT DOCUMENTS

| | | | |
|---|---|---|---|
| JP | 6727103 | B2 | 7/2020 |
| JP | 2021190255 | A | 12/2021 |
| KR | 20080101871 | A | 11/2008 |
| WO | 2007094149 | A1 | 8/2007 |

* cited by examiner

CONNECTOR AND ELECTRONIC DEVICE

CROSS-REFERENCE TO RELATED APPLICATIONS

The present application claims priority to Japanese Patent Application No. 2021-016954, filed Feb. 4, 2021, the entire disclosure of which is incorporated herein by reference.

TECHNICAL FIELD

The present disclosure relates to a connector and an electronic device.

BACKGROUND OF INVENTION

In the related art, a connector having a floating structure is known as an example of a technique for improving the reliability of connection with a connection target, the floating structure accommodating the positional deviation between a connection target and a connector by allowing a movable insulator, which is a portion of the connector, to move even during and after fitting the connector and the connection target together.

Patent Literature 1 discloses an electrical connector for a circuit board capable of increasing the amount of elastic deformation of an elastic portion of a terminal while ensuring a reduction in height by reducing a heightwise dimension of the connector in a state where the terminal is securely held on a stationary housing and a movable housing by integral molding. Such an electrical connector for a circuit board has a floating structure.

CITATION LIST

Patent Literature

Patent Literature 1: Japanese Patent No. 6727103

SUMMARY

In an embodiment of the present disclosure, a connector includes a first insulator, a second insulator, and a contact.

The first insulator is formed in a rectangular shape and includes a pair of first side walls and a bottom wall.

The second insulator extends along a longitudinal direction of the first insulator. The second insulator is partially positioned in a space surrounded by the pair of first side walls and the bottom wall and is movable relative to the first insulator.

The contact is mounted on the first side walls of the first insulator and on the second insulator and includes an elastic portion. The elastic portion is located between the first insulator and the second insulator and connects the first insulator and the second insulator to each other.

The second insulator and the elastic portion are spaced apart from the first insulator and face the bottom wall in a non-fitted state in which the second insulator and a connection target are not fitted to each other.

An end portion of the elastic portion on the bottom wall side is located further toward the bottom wall side than an end portion of the second insulator on the bottom wall side.

In an embodiment of the present disclosure, an electronic device includes the above-described connector.

DESCRIPTION OF EMBODIMENTS

Figure 1:
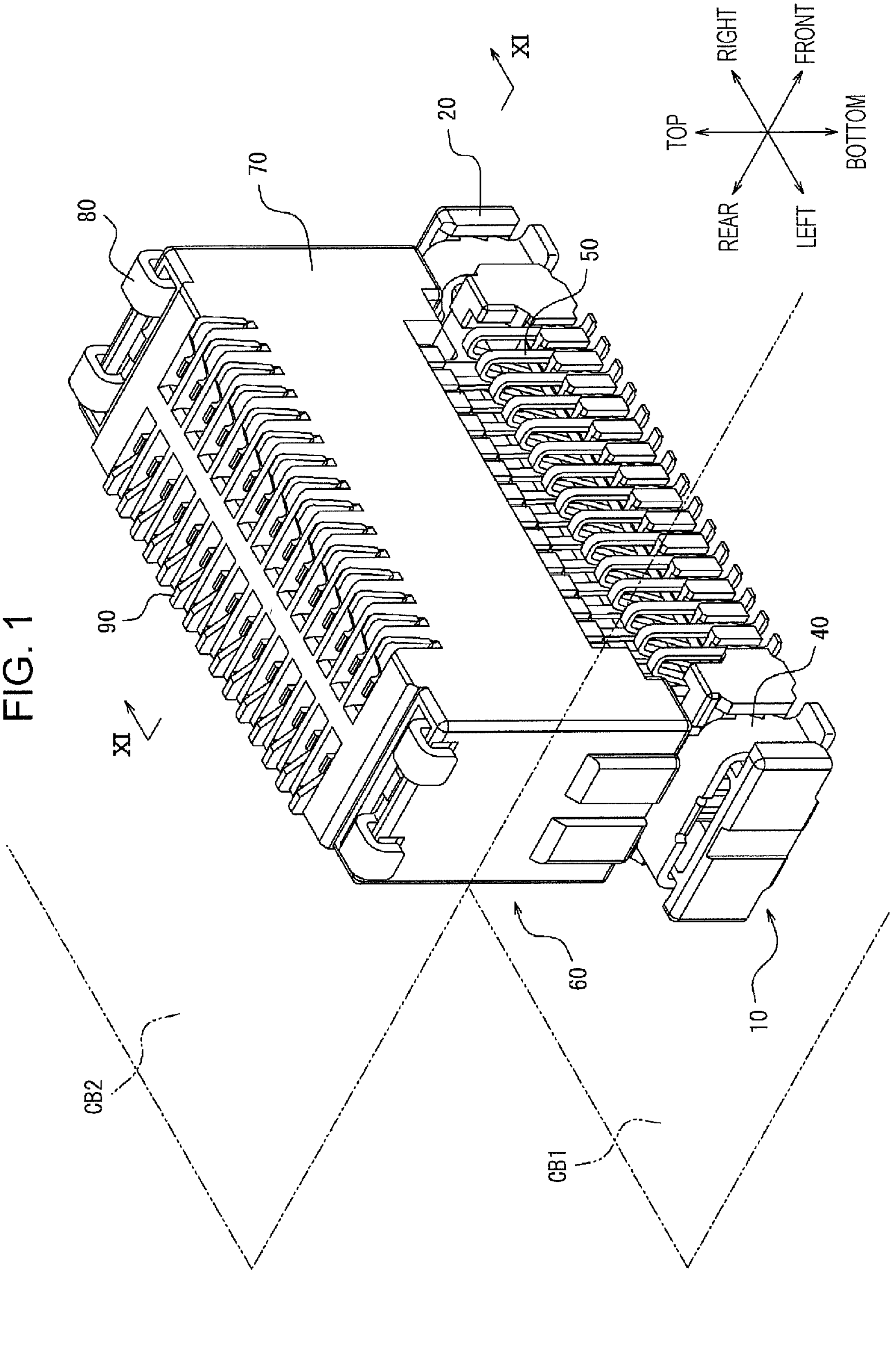
FIG. 1 is an external perspective view of a connector according to an embodiment in a state of being connected to a connection target when viewed from the top surface of the connector.

In a connector having a floating structure, a sufficient movable amount of a movable insulator along a fitting direction in which the connector and a connection target are fitted to each other is desirably obtained. Patent Literature 1 in which the electrical connector for a circuit board is described focuses mainly on movement of a movable insulator along a direction perpendicular to a fitting direction, that is, for example, in a direction parallel to the circuit board. If the movable insulator moves in the fitting direction in the electrical connector for a circuit board described in Patent Literature 1, components of the connector, such as a contact and the movable insulator, may possibly come into contact with the circuit board. As a result, problems such as deformation and breakage may possibly occur in the contact. Such a problem may possibly cause deterioration of the connector's movable characteristics, which are due to its floating structure. When the contact comes into contact with the circuit board, an electrical failure such as a short-circuit may possibly occur.

In an embodiment of the present disclosure, a connector and an electronic device are capable of reducing deterioration of movable characteristics that are obtained due to a floating structure and occurrence of an electrical failure in a circuit board while allowing a movable insulator to move in a fitting direction.

An embodiment of the present disclosure will be described in detail below with reference to the accompanying drawings. In the following description, a "depth direction" corresponds to forward and rearward directions indicated by arrows in the drawings. A "longitudinal direction" corresponds to leftward and rightward directions indicated by arrows in the drawings. A "vertical direction" corresponds to upward and downward directions indicated by arrows in the drawings. The directions indicated by arrows are consistent among different figures, which are FIG. 1 to FIG. 8 and FIG. 11. The directions indicated by arrows are consistent between FIG. 9 and FIG. 10. In some of the drawings, circuit boards CB1 and CB2, which will be described later, are not illustrated for simplicity of illustration.

Figure 2:
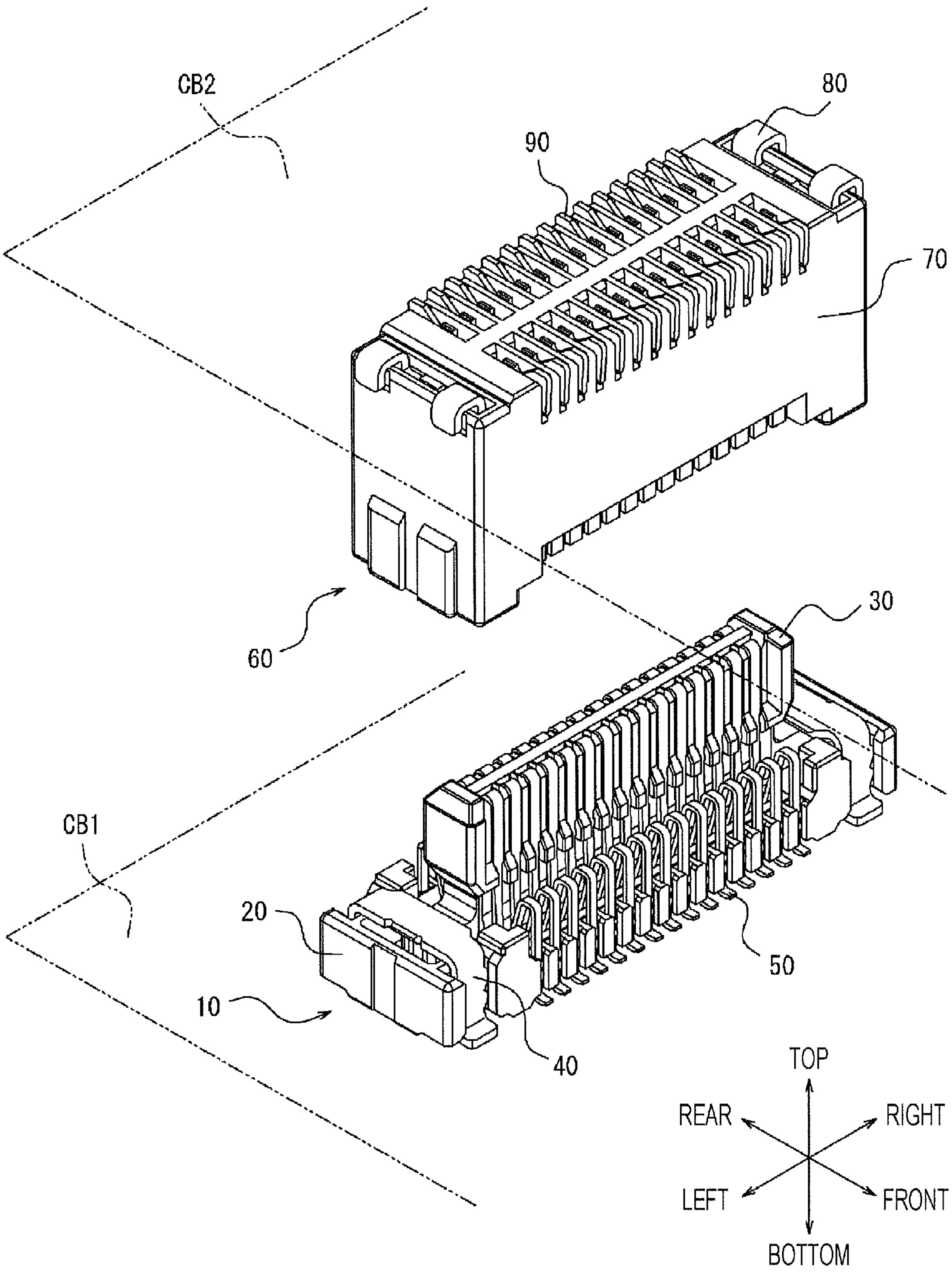
FIG. 2 is an external perspective view of the connector according to the embodiment in a state of being separated from the connection target when viewed from the top surface of the connector.

FIG. 1 is an external perspective view of a connector 10 according to the embodiment in a state of being connected to a connection target 60 when viewed from the top surface of the connector 10. FIG. 2 is an external perspective view of the connector 10 according to the embodiment in a state of being separated from the connection target 60 when viewed from the top surface of the connector 10. For example, as illustrated in FIG. 2, the connector 10 includes a first insulator 20 serving as a stationary insulator, a second insulator 30 serving as a movable insulator, metal fittings 40, and contacts 50. The connection target 60 includes an insulator 70, metal fittings 80, and contacts 90.

In the embodiment that will be described below, the connector 10 is, for example, a plug connector. The connection target 60 will be described as a receptacle connector. In the connector 10 that will be described as a plug connector, portions of the contacts 50 that are in contact with the contacts 90 in a fitted state in which the connector 10 and the connection target 60 are fitted to each other do not become elastically deformed. In contrast, in the connection target 60 that will be described as a receptacle connector, portions of the contacts 90 that are in contact with the contacts 50 in the fitted state are elastically deformed. The type of the connector 10 and the type of the connection target 60 are not limited to those mentioned above. For example, the connector 10 may serve as a receptacle connector, and the connection target 60 may serve as a plug connector.

The connector 10 and the connection target 60 will be described below as being mounted onto the circuit boards CB1 and CB2, respectively. The connector 10 electrically connects the circuit board CB2, on which the connection target 60 is mounted, and the circuit board CB1 to each other via the connection target 60 fitted to the connector 10. The circuit boards CB1 and CB2 may be rigid substrates or may be any other circuit boards. For example, at least one of the circuit board CB1 or the circuit board CB2 may be a flexible printed circuit board (FPC).

The connector 10 and the connection target 60 will be described below as being connected to each other in a direction perpendicular to the circuit boards CB1 and CB2. As an example, the connector 10 and the connection target 60 are connected to each other along the vertical direction. The connector 10 and the connection target 60 are not limited to being connected to each other in the manner mentioned above. The connector 10 and the connection target 60 may be connected to each other in a direction parallel to the circuit boards CB1 and CB2. The connector 10 and the connection target 60 may be connected to each other in such a manner that one of them is perpendicular to the circuit board on which the one of them is mounted while the other of them is parallel to the circuit board on which the other of them is mounted.

The phrase "fitting direction" used in the following description refers to the vertical direction, as an example. The wording "lateral direction of the connector 10" refers to the depth direction, as an example. The wording "longitudinal direction of the connector 10" refers to the longitudinal direction, as an example. The wording "longitudinal direction of the first insulator 20" refers to the longitudinal direction, as an example. The phrase "bottom wall 22 side" refers to the lower side as an example. The wording "side opposite to the second insulator 30" refers to the lower side as an example. The phrase "non-fitted state" refers to a state in which the second insulator 30 and the connection target 60 are not fitted to each other and a state in which elastic portions 53 of the contacts 50, which will be described later, are not elastically deformed by an external force.

In the embodiment, the connector 10 has a floating structure. The connector 10 allows the connection target 60, which is connected to the connector 10, to move relative to the circuit board CB1 in the six directions, which are the upward, downward, forward, rearward, leftward, and rightward directions. Even in a state where the connection target 60 is connected to the connector 10, the connection target 60 can move relative to the circuit board CB1 within a predetermined range in the six directions, which are the upward, downward, forward, rearward, leftward, and rightward directions.

Figure 3:
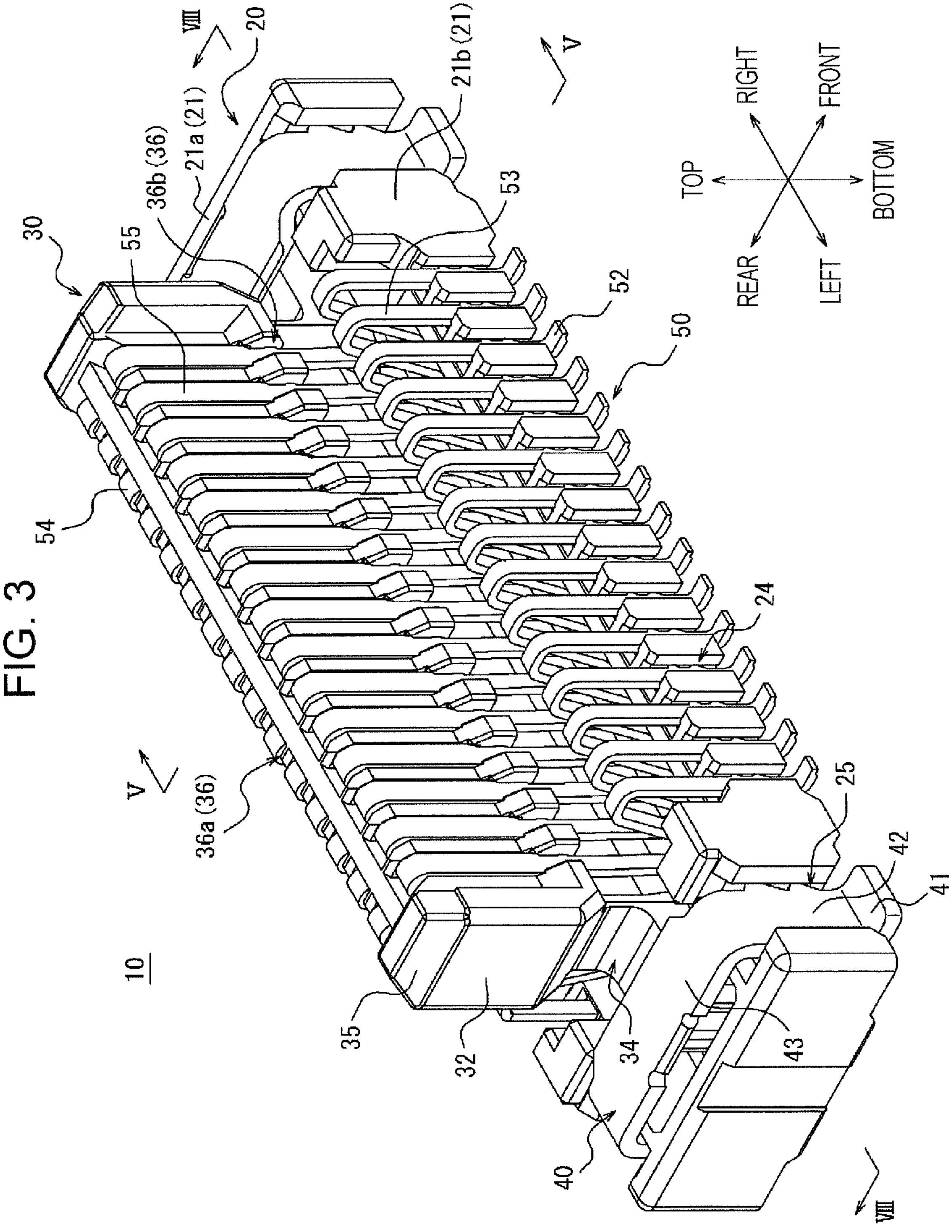
FIG. 3 is an external perspective view of only the connector illustrated in FIG. 1 when viewed from the top surface.
Figure 4:
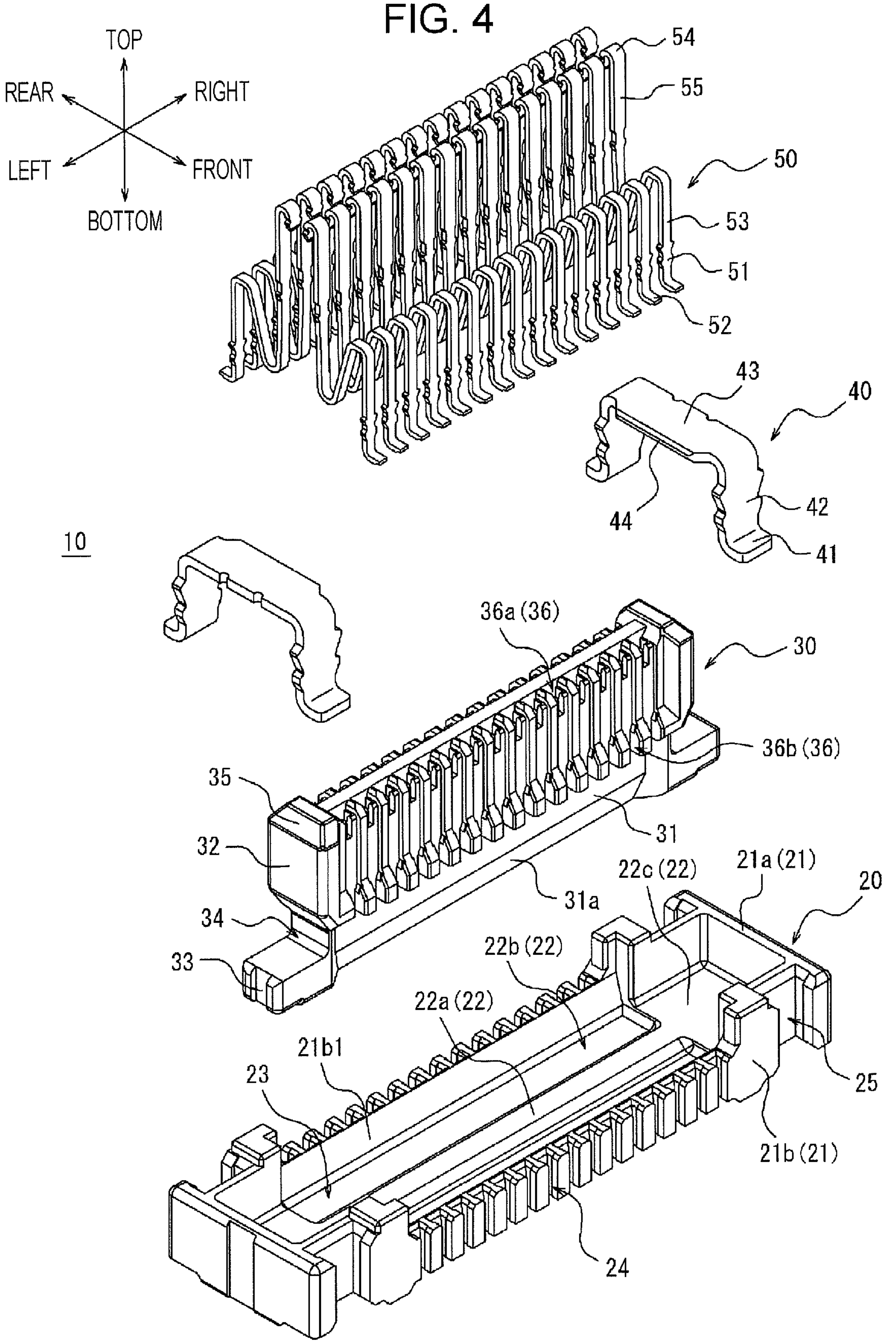
FIG. 4 is an exploded perspective view of the connector illustrated in FIG. 3 when viewed from the top surface.
Figure 5:
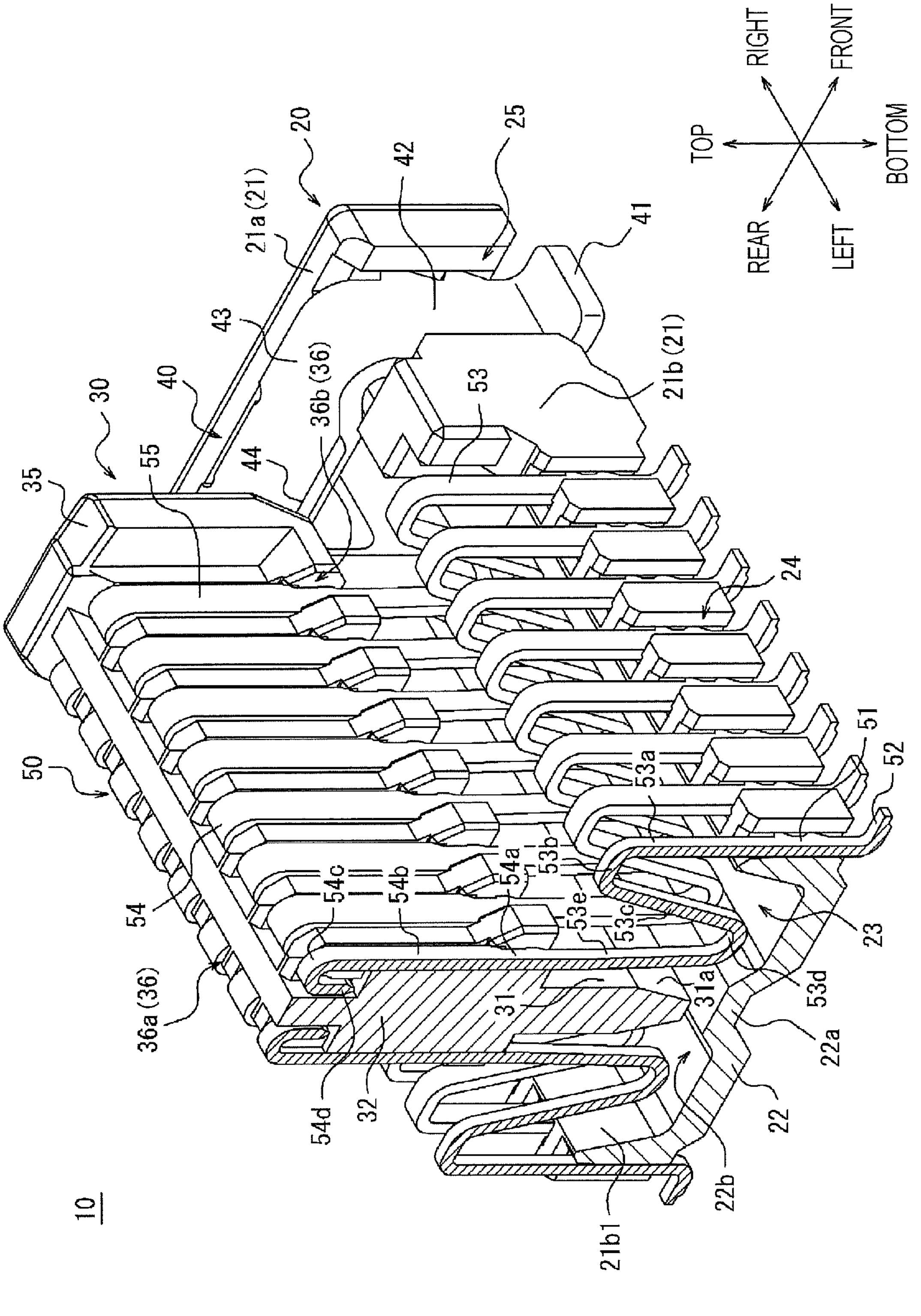
FIG. 5 is a cross-sectional perspective view taken along line V-V of FIG. 3.
Figure 6:
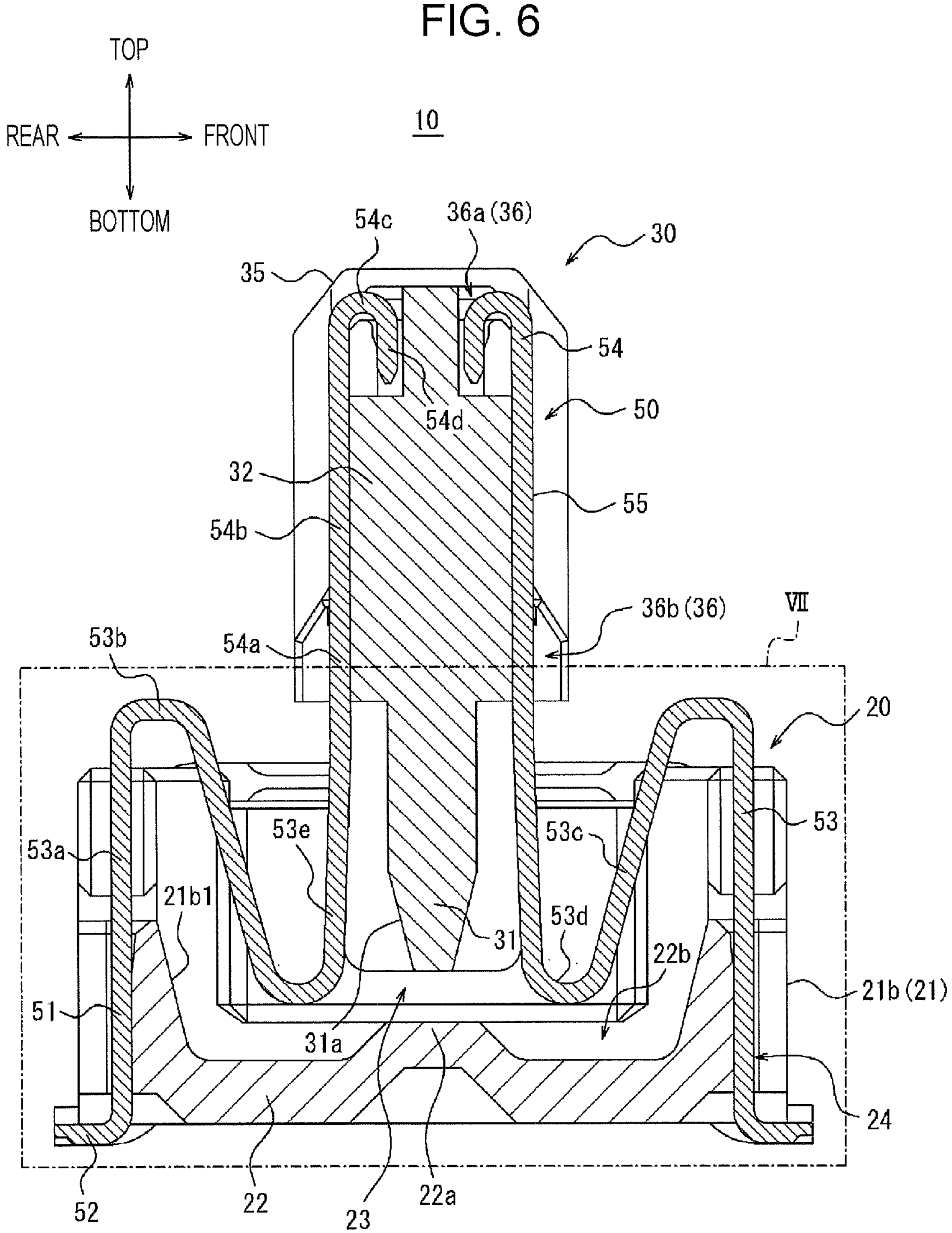
FIG. 6 is a cross-sectional view taken along line V-V of FIG. 3.
Figure 7:
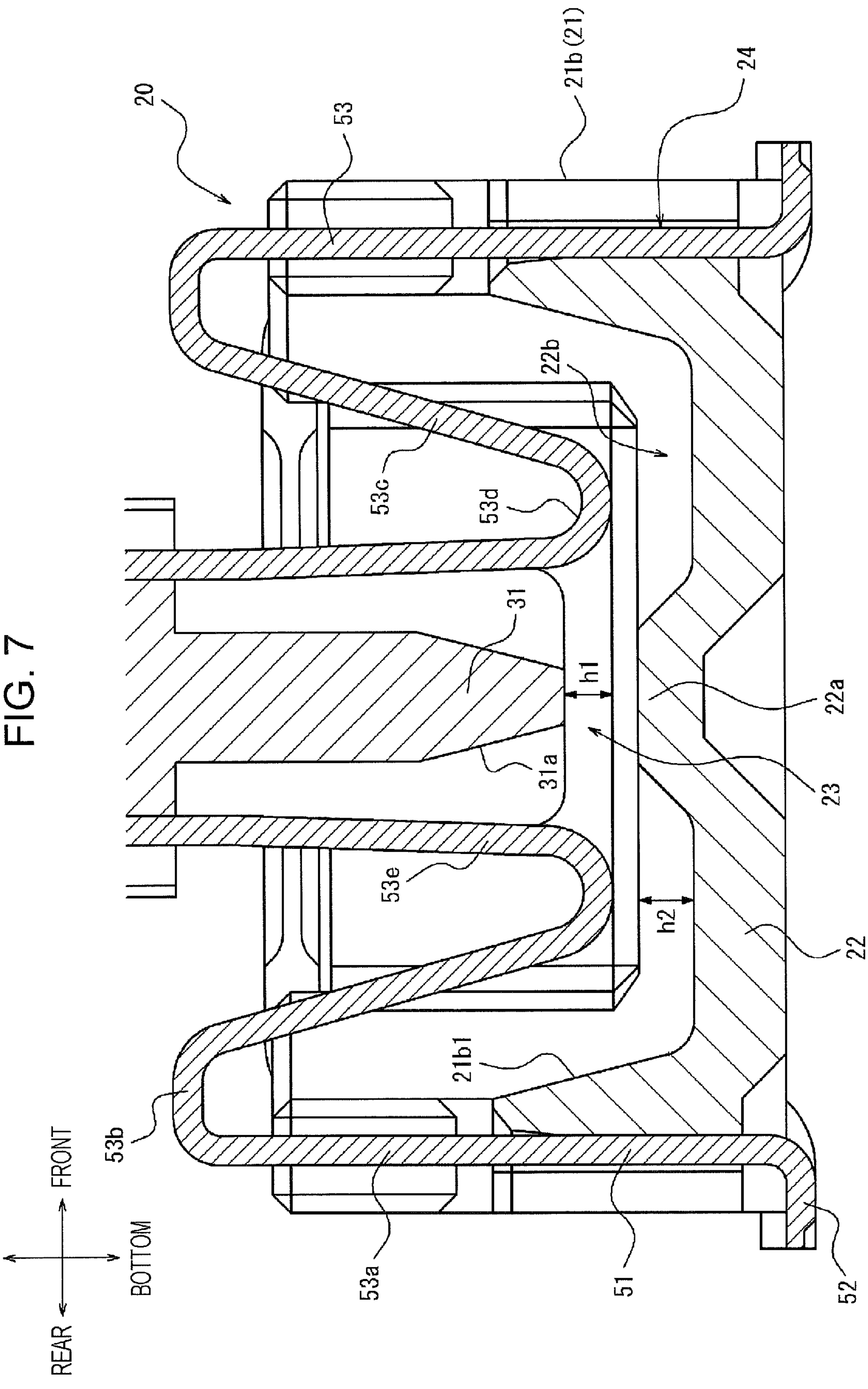
FIG. 7 is an enlarged view of a portion VII that is surrounded by a dashed line illustrated in FIG. 6.
Figure 8:
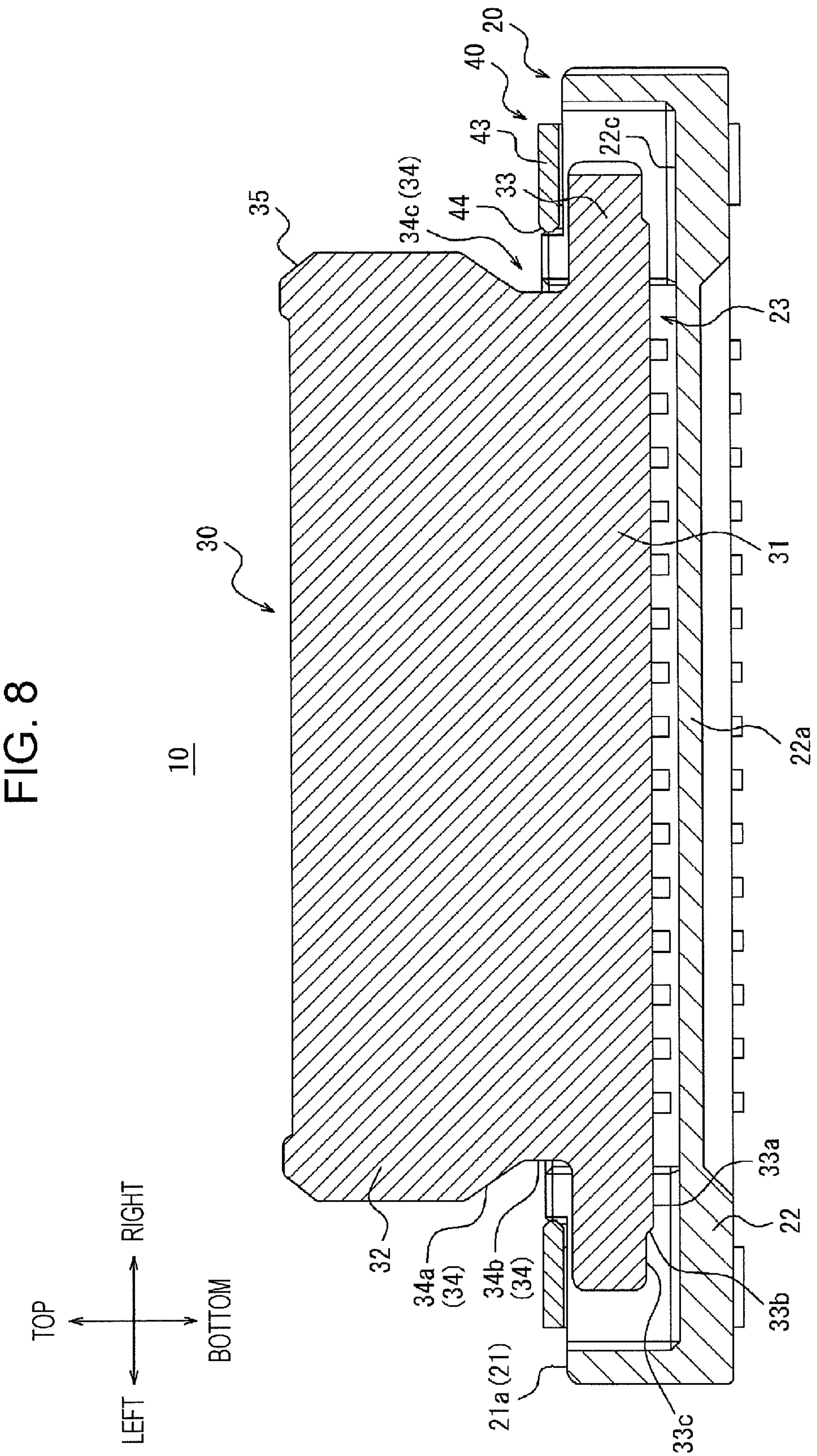
FIG. 8 is a sectional view taken along line VIII-VIII of FIG. 3.

FIG. 3 is an external perspective view of only the connector 10 illustrated in FIG. 1 when viewed from the top surface. FIG. 4 is an exploded perspective view of the connector 10 illustrated in FIG. 3 when viewed from the top surface. FIG. 5 is a cross-sectional perspective view taken along line V-V of FIG. 3. FIG. 6 is a cross-sectional view taken along line V-V of FIG. 3. FIG. 7 is an enlarged view of a portion VII that is surrounded by a dashed line illustrated in FIG. 6. FIG. 8 is a sectional view taken along line VIII-VIII of FIG. 3.

As illustrated in FIG. 4, the connector 10 is assembled in the following manner by way of example. In a state where the second insulator 30 is located inside the first insulator 20, the metal fittings 40 are press-fitted onto the first insulator 20 from above. Similarly, the contacts 50 are press-fitted into the first insulator 20 and the second insulator 30 from above.

The configurations of the components of the connector 10 in the non-fitted state will be mainly described below. The configuration of the first insulator 20 will be mainly described with reference mainly to FIG. 4.

As illustrated in FIG. 4, the first insulator 20 is a member formed by injection molding of a synthetic-resin material having an insulating property and heat resistance, the member extending in the longitudinal direction. The first insulator 20 is formed in a rectangular shape. The first insulator 20 includes four side walls, which are front, rear, left and right side walls, and an outer peripheral wall 21 surrounding the interior space of the first insulator 20. More specifically, the outer peripheral wall 21 is formed of a pair of lateral walls **21*a* located on the left and right sides and a pair of longitudinal walls 21*b* located on the front and rear sides. The pair of lateral walls 21*a* are perpendicular to the pair of longitudinal walls 21*b* and forms the outer peripheral wall 21 together with the longitudinal walls 21*b*. The longitudinal walls 21*b* each have an inclined surface 21*b*1 forming the inner surface thereof in the depth direction and inclined toward the inside of the first insulator 20 such that the lower end of the inclined surface 21*b*1 is closer to the inside of the first insulator 20 than the upper end of the inclined surface 21*b*1**.

The first insulator 20 includes a bottom wall 22. The outer peripheral wall 21 projects upward from a peripheral edge of the bottom wall 22. The bottom wall 22 is continuously formed so as to connect the pair of longitudinal walls **21*b*. The bottom wall 22 includes a contact portion 22*a*. The contact portion 22*a* is located at the center of the bottom wall 22 in the longitudinal direction and protrudes upward in a mountain-like shape from the upper surface of the bottom wall 22. The upper surface of the contact portion 22***a* forms a contact surface. Recesses 22*b* are formed in the bottom wall 22 such that each of the recesses 22*b* is formed between one of the longitudinal walls 21*b* and the contact portion 22*a*. The bottom surfaces of the recesses 22*b* are each continuously formed. The bottom wall 22 has bottom surfaces 22*c* that are flush with the upper surface of the contact portion 22*a*, the bottom surfaces 22*c* forming the upper surfaces of left and right end portions of the bottom wall 22. A movable space 23 is formed in the first insulator 20 and includes the interior space of the first insulator 20, which is surrounded by the outer peripheral wall 21 and the bottom wall 22.

The first insulator 20 includes multiple contact mount grooves 24 formed by recessing the outer sides of the longitudinal walls 21*b* in the depth direction such that the contact mount grooves 24 extend along the vertical direction. The multiple contact mount grooves 24 are formed in such a manner as to be spaced apart from one another at a predetermined pitch along the longitudinal direction. Metal-fitting mount grooves 25 are formed at left and right end portions of the first insulator 20 by recessing the entire outer surfaces of the pair of longitudinal walls 21*b*, which are spaced apart from each other in the depth direction.

The configuration of the second insulator 30 will be described with reference mainly to FIG. 4 and FIG. 8. The second insulator 30 is disposed in the movable space 23 of the first insulator 20 and is movable relative to the first insulator 20. The second insulator 30 is fitted into the connection target 60.

As illustrated in FIG. 4 and FIG. 8, the second insulator 30 is a member formed by injection molding of a synthetic-resin material having an insulating property and heat resistance, the member extending in the longitudinal direction. The second insulator 30 has a shape in which a lower portion thereof projects leftward and rightward in a front view when viewed from the front. The second insulator 30 includes a bottom portion 31 and a fit projection 32. The bottom portion 31 forms the lower portion of the second insulator 20 The fit projection 32 projects upward from the bottom portion 31 so as to be fitted into the connection target 60. The bottom portion 31 is longer than the fit projection 32 in the longitudinal direction. As also illustrated in FIG. 5, the bottom portion 31 has tapered surfaces 31*a* and is tapered toward the bottom wall 22 side along the vertical direction. The bottom portion 31 includes retain protrusions 33 forming left and right end portions thereof. The retain protrusions 33 are formed at the ends of the bottom portion 31 in the longitudinal direction of the first insulator 20.

For example, as illustrated in FIG. 8, the bottom surfaces of the retain protrusions 33 on the bottom wall 22 side each include a first surface 33*a* formed so as to be flush with a portion of the bottom portion 31, the portion facing the contact portion 22*a*. The bottom surfaces of the retain protrusions 33 on the bottom wall 22 side each include an inclined surface 33*b* inclined from the corresponding first surface 33*a* toward the side opposite to the bottom wall 22 side. The bottom surfaces of the retain protrusions 33 on the bottom wall 22 side each include a second surface 33*c* that is contiguous to the corresponding inclined surface 33*b* and approximately parallel to the corresponding first surface 33*a*.

The second insulator 30 includes constricted portions 34 formed at the lower ends of the fit projection 32 so as to reduce the width of the fit projection 32 in the longitudinal direction. Each of the constricted portions 34 has a tapered surface 34*a* and a counter surface 34*b*. Each of the tapered surfaces 34*a* is inclined obliquely inward such that the lower end of the tapered surface 34*a* is positioned further toward the inner side than the upper end of the tapered surface 34*a*. Each of the counter surfaces 34*b* is formed as to be contiguous to the lower side of the corresponding tapered surface 34*a*. A clearance space 34*c* is formed in each of the constricted portions 34 and defined by the corresponding tapered surface 34*a*, the corresponding counter surface 34*b*, and the top surface of the corresponding retain protrusion 33.

The second insulator 30 includes guide portions 35 formed over the upper edges of the left and right end portions of the fit projection 32. Each of the guide portions 35 has an inclined surface inclined obliquely outward at the upper edge of a corresponding one of the left and right end portions of the fit projection 32 such that the lower end of the guide portion 35 is positioned further toward the outer side than the upper end of the guide portion 35.

Multiple contact mount grooves 36 are formed in the second insulator 30 in such a manner as to be spaced apart from one another at a predetermined pitch along the longitudinal direction. The contact mount grooves 36 extend in the vertical direction over substantially the entire outer surfaces of the fit projection 32 in the depth direction. Each of the contact mount grooves 36 includes a first engagement portion 36*a* formed by recessing the upper end of the fit projection 32. Each of the contact mount grooves 36 includes a second engagement portion 36*b* formed by recessing the lower end thereof.

The configuration of each of the metal fittings 40 will be described with reference mainly to FIG. 4.

Each of the metal fittings 40 is obtained by forming a thin plate made of a metal material into the shape illustrated in FIG. 4 by using a progressive die (by stamping). The method of processing the metal fittings 40 includes a step of bending in the plate-thickness direction that is performed after blanking. Each of the metal fittings 40 is formed so as to have a U-shape in a front view when viewed in the longitudinal direction.

Each of the metal fittings 40 includes mount portions 41 formed at lower end portions thereof in the depth direction, each of the mount portions 41 extending outward so as to have an L-shape. Each of the metal fittings 40 includes engagement portions 42 each of which extends upward from the upper end of a corresponding one of the mount portions 41. Each of the metal fittings 40 includes a retain portion 43 extending in the depth direction so as to connect the engagement portions 42 located on the front and rear sides of the retain portion 43. Each of the metal fittings 40 includes a protrusion 44 protruding one step inward from the longitudinal inner edge of a center portion of the retain portion 43 in the longitudinal direction. Each of the protrusions 44 extends in the depth direction along the longitudinal inner edge of the corresponding retain portion 43.

The configuration of each of the contacts 50 will be described with reference mainly to FIG. 4 to FIG. 7.

For example, each of the contacts 50 is obtained by forming a thin plate made of a copper alloy containing phosphor bronze, beryllium copper, or titanium copper and has spring elasticity or a Corson copper alloy into the shape illustrated in FIG. 4 to FIG. 7 by using a progressive die (by stamping). The contacts 50 are formed by performing bending in the plate-thickness direction after blanking. The method of processing the contacts 50 is not limited to this and may only include the blanking step. The contacts 50 are made of, for example, a metallic material having a low elastic modulus so that the shapes of the contacts 50 undergo significant change upon elastic deformation of the contacts 50. An undercoat is formed on the surface of each of the contacts 50 by nickel plating, and then, gold plating, tin plating, or the like is performed on the undercoat.

As illustrated in FIG. 4, the multiple contacts 50 are arranged along the longitudinal direction. As illustrated in FIG. 5, the contacts 50 are mounted on the first insulator 20 and the second insulator 30. As illustrated in FIG. 5 and FIG. 6, a pair of contacts 50 that are included in the contacts 50 and that are located at the same position in the longitudinal direction are formed and arranged so as to be symmetric to each other in the depth direction. The pair of contacts 50 are formed and arranged so as to be line-symmetrical to each other with respect to a vertical axis passing through the center of the space between the contacts 50.

Each of the contacts 50 includes a first engagement portion 51 extending along the vertical direction and supported by the first insulator 20. Each of the contacts 50 includes a mount portion 52 extending outward from the lower end of the first engagement portion 51 so as to have an L-shape. Each of the contacts 50 includes one of the elastic portions 53 positioned between the first insulator 20 and the second insulator 30.

Each of the elastic portions 53 includes a first extension portion 53*a* linearly extending upward from the upper end of the corresponding first engagement portion 51. Each of the elastic portions 53 includes a first folded portion 53*b* extending from the corresponding first extension portion 53*a* and folded back in an inverted U-shape. Each of the elastic portions 53 includes a second extension portion 53*c* linearly and obliquely extending downward from the corresponding first folded portion 53*b* toward the second insulator 30. Each of the elastic portions 53 includes a second folded portion 53*d* extending from the corresponding second extension portion 53*c* and folded back in a U-shape. Each of the elastic portions 53 includes a third extension portion 53*e* linearly extending upward from the corresponding second folded portion 53*d* to a second engagement portion 54*a*, which will be described below. In FIG. 6 and the like, a shape obtained by turning one of the first folded portions 53*b* upside down and the shape of each of the second folded portions 53*d* are not the same as each other and are different U-shapes. However, the present disclosure is not limited to this case. The shape obtained by turning one of the first folded portions 53*b* upside down and the shape of each of the second folded portions 53*d* may be the same U-shape.

Each of the contacts 50 includes a supported portion 54 extending along the vertical direction so as to have an inverted U-shape and supported by the second insulator 30. Each of the supported portions 54 includes the second engagement portion 54*a* extending continuously from the upper end of the third extension portion 53*e* of the corresponding elastic portion 53. Each of the supported portions 54 includes a fourth extension portion 54*b* linearly extending upward from the corresponding second engagement portion 54*a*. Each of the supported portions 54 includes a third folded portion 54*c* extending from the corresponding fourth extension portion 54*b* and folded back in an inverted U-shape. Each of the supported portions 54 includes a third engagement portion 54*d* formed in such a manner as to be contiguous to the corresponding third folded portion 54*c* and located at the end of the corresponding contact 50 on the side on which the second insulator 30 is present. Each of the contacts 50 includes a contact portion 55 formed as an outer surface of the corresponding fourth extension portion 54*b* in the depth direction.

As illustrated in FIG. 5 to FIG. 7, the first engagement portions 51 of the contacts 50 each engage a corresponding one of the contact mount grooves 24 formed in the longitudinal walls 21*b* of the first insulator 20. The second engagement portions 54*a* of the contacts 50 each engage a corresponding one of the second engagement portions 36*b* of the contact mount grooves 36, which are formed in the fit projection 32 of the second insulator 30. The third engagement portions 54*d* of the contacts 50 each engage a corresponding one of the first engagement portions 36*a* of the contact mount grooves 36, which are formed in the fit projection 32 of the second insulator 30. As illustrated in FIG. 5, the contact portions 55 of the contacts 50 are each exposed through a corresponding one of the contact mount grooves 36 of the second insulator 30 in the depth direction.

As illustrated in FIG. 5 to FIG. 8, the contacts 50 support the second insulator 30 in such a manner that the second insulator 30 floats inside the first insulator 20 while being separated from the first insulator 20.

The second insulator 30 is disposed inside the first insulator 20 in such a manner as to be separated from the first insulator 20. The second insulator 30 extends along the longitudinal direction of the first insulator 20. A portion of the second insulator 30 is disposed in a space surrounded by the pair of longitudinal walls 21*b* and the bottom wall 22. In this case, the second insulator 30 is movable relative to the first insulator 20.

When the second insulator 30 is held by the contacts 50 with respect to the first insulator 20, the bottom portion 31 of the second insulator 30 is disposed in the movable space 23 of the first insulator 20. The bottom portion 31 of the second insulator 30 is surrounded by the outer peripheral wall 21 of the first insulator 20. In this case, the bottom portion 31 faces the contact portion 22*a* of the first insulator 20. The recesses 22*b* are each formed so as to be further recessed toward the side opposite to the side on which the second insulator 30 is present than the contact surface of the contact portion 22*a*, which faces the second insulator 30. The fit projection 32 of the second insulator 30 projects upward from the movable space 23 of the first insulator 20 and is disposed so to be capable of being fitted into the connection target 60.

As illustrated in FIG. 5 to FIG. 7, the elastic portions 53 of the contacts 50 are located between the first insulator 20 and the second insulator 30 and connect the first insulator 20 and the second insulator 30 to each other. The elastic portions 53 are exposed through the first insulator 20 and the second insulator 30 in a state where the contacts 50 are mounted on the longitudinal walls 21*b* of the first insulator 20 and the fit projection 32 of the second insulator 30. In this case, the lower portions of the elastic portions 53 are located in the movable space 23 of the first insulator 20.

As illustrated in FIG. 7, in the non-fitted state, the second insulator 30 and the elastic portions 53 of the contacts 50 are separated from the bottom wall 22 of the first insulator 20 in the fitting direction and face the bottom wall 22 of the first insulator 20. For example, the lower surface of the bottom portion 31 of the second insulator 30 faces the upper surface of the contact portion 22*a* of the bottom wall 22. For example, the lower ends of the second folded portions 53*d* of the elastic portions 53 face the bottom surfaces of the recesses 22*b* of the bottom wall 22. The contact portion 22*a* of the bottom wall 22 faces the second insulator 30 and protrudes from a portion facing the elastic portions 53 toward the second insulator 30. The bottom wall 22, in which the recesses 22*b* are formed, is positioned between the circuit board CB1 on which the connector 10 is mounted and the elastic portions 53 of the contacts 50.

End portions of the elastic portions 53 on the bottom wall 22 side are located further toward the bottom wall 22 side than an end portion of the second insulator 30 on the bottom wall 22 side. The lower ends of the second folded portions 53*d* are located further toward the bottom wall 22 side than the lower surface of the bottom portion 31 of the second insulator 30. The lower surface of the bottom portion 31 of the second insulator 30 and the lower ends of the second folded portions 53*d* are located in the movable space 23 of the first insulator 20. A space is formed between the lower surface of the bottom portion 31 of the second insulator 30 and the lower ends of the second folded portions 53*d* and the bottom wall 22, and this space allows the second insulator 30 to move toward the bottom wall 22 side as a result of elastic deformation of the elastic portions 53.

For example, a depth h2 of each of the recesses 22*b* may be larger than a distance h1 in the fitting direction between the end portion of the second insulator 30 on the bottom wall 22 side and the end portion of each of the elastic portions 53 on the bottom wall 22 side. The depth h2 of each of the recesses 22*b* may be larger than the vertical distance h1 between the lower surface of the bottom portion 31 of the second insulator 30 and the lower end of each of the second folded portions 53*d*. The depth h2 of each of the recesses 22*b* corresponds to the vertical distance from the upper surface of the contact portion 22*a* to the bottom surface of each of the recesses 22*b*.

The inclined surfaces 21*b*1 of the longitudinal walls 21*b* are inclined obliquely downward in such a manner as to face the second extension portion 53*c* of the contacts 50. For example, the inclined surfaces 21*b*1 are inclined so as to be approximately parallel to the corresponding second extension portion 53*c*. Similarly, the tapered surfaces 31*a* of a portion of the bottom portion 31 of the second insulator 30 in the depth direction, the portion of the bottom portion 31 being tapered toward the bottom wall 22, are each inclined so as to be approximately parallel to the corresponding second extension portions 53*c*.

As illustrated in FIG. 5, the engagement portions 42 of the metal fittings 40 each engage one of the metal-fitting mount grooves 25 of the first insulator 20. The metal fittings 40 are press-fitted to the metal-fitting mount grooves 25 of the first insulator 20 and located at the left and right end portions of the first insulator 20.

In a state where the metal fittings 40 are fitted on the first insulator 20, end portions of the movable space 23 in the longitudinal direction are covered with the retain portions 43 of the metal fittings 40 from above. As illustrated in FIG. 8, when the second insulator 30 is held by the contacts 50 with respect to the first insulator 20, the upper surfaces of the retain protrusions 33, which are included in the bottom portion 31 of the second insulator 30, each face the lower surface of one of the retain portions 43 in the vertical direction. The counter surfaces 34*b* of the constricted portions 34 of the second insulator 30 each face the protrusion 44 of one of the metal fittings 40 in the longitudinal direction.

In this case, the retain protrusions 33 face the bottom surfaces 22*c* of the bottom wall 22 of the first insulator 20, which are formed so as to be flush with the contact portion 22*a*. For example, the lower surfaces of the retain protrusions 33 each face one of the bottom surfaces 22*c* of the first insulator 20 in the vertical direction. Similarly, the retain protrusions 33 face the pair of longitudinal walls 21*b* and the pair of lateral walls 21*a*. For example, the two side surfaces of each of the retain protrusions 33 in the depth direction face the pair of longitudinal walls 21*b* of the first insulator 20 in the depth direction. For example, the side surfaces of each of the retain protrusions 33 in the longitudinal direction face the lateral walls 21*a* of the first insulator 20 in the longitudinal direction.

The connector 10 having a configuration such as that described above is mounted onto, for example, a circuit formation surface included in a mounting surface of the circuit board CB1. More specifically, the mount portions 41 of the metal fittings 40 are each placed onto a solder paste portion formed by applying solder paste to a pattern on the circuit board CB1. The mount portions 52 of the contacts 50 are each placed onto a solder paste portion formed by applying the solder paste to the pattern on the circuit board CB1. By heating and melting the solder paste portions in a reflow furnace or the like, the mount portions 41 and the mount portions 52 are soldered to the above-mentioned pattern. As a result, the mounting of the connector 10 onto the circuit board CB1 is completed. For example, another electronic component, such as a central processing unit (CPU), a controller, or a memory, other than the connector 10 is mounted onto the circuit formation surface of the circuit board CB1.

The structure of the connection target 60 will be described with reference mainly to FIG. 9 and FIG. 10.

Figure 9:
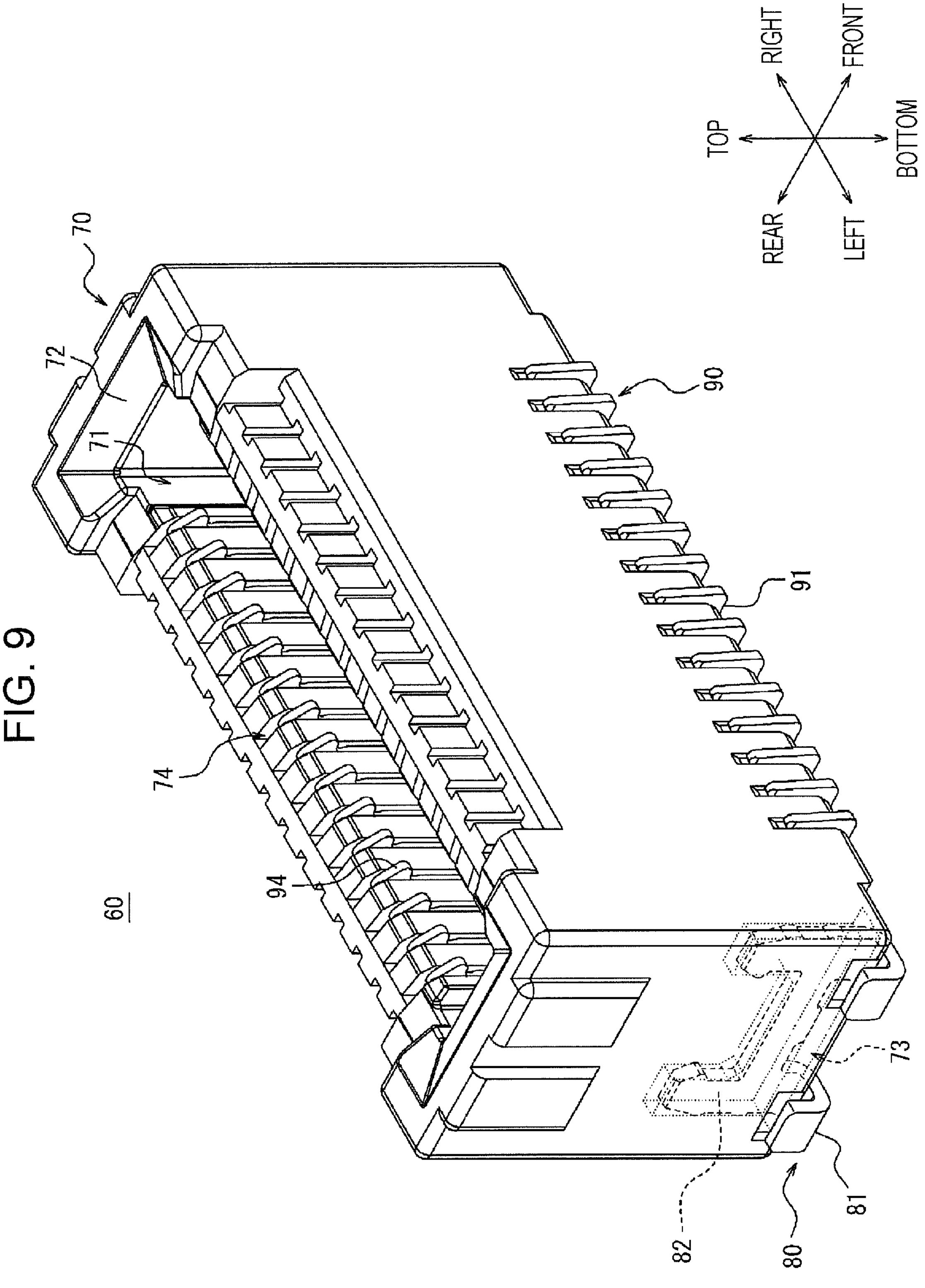
FIG. 9 is an external perspective view of the connection target when viewed from the top surface, the connection target being configured to be connected to the connector illustrated in FIG. 3.

FIG. 9 is an external perspective view of the connection target 60 to be connected to the connector 10 illustrated in FIG. 3 when viewed from the top surface. FIG. 10 is an exploded perspective view of the connection target 60 illustrated in FIG. 9 when viewed from the top surface.

Figure 10:
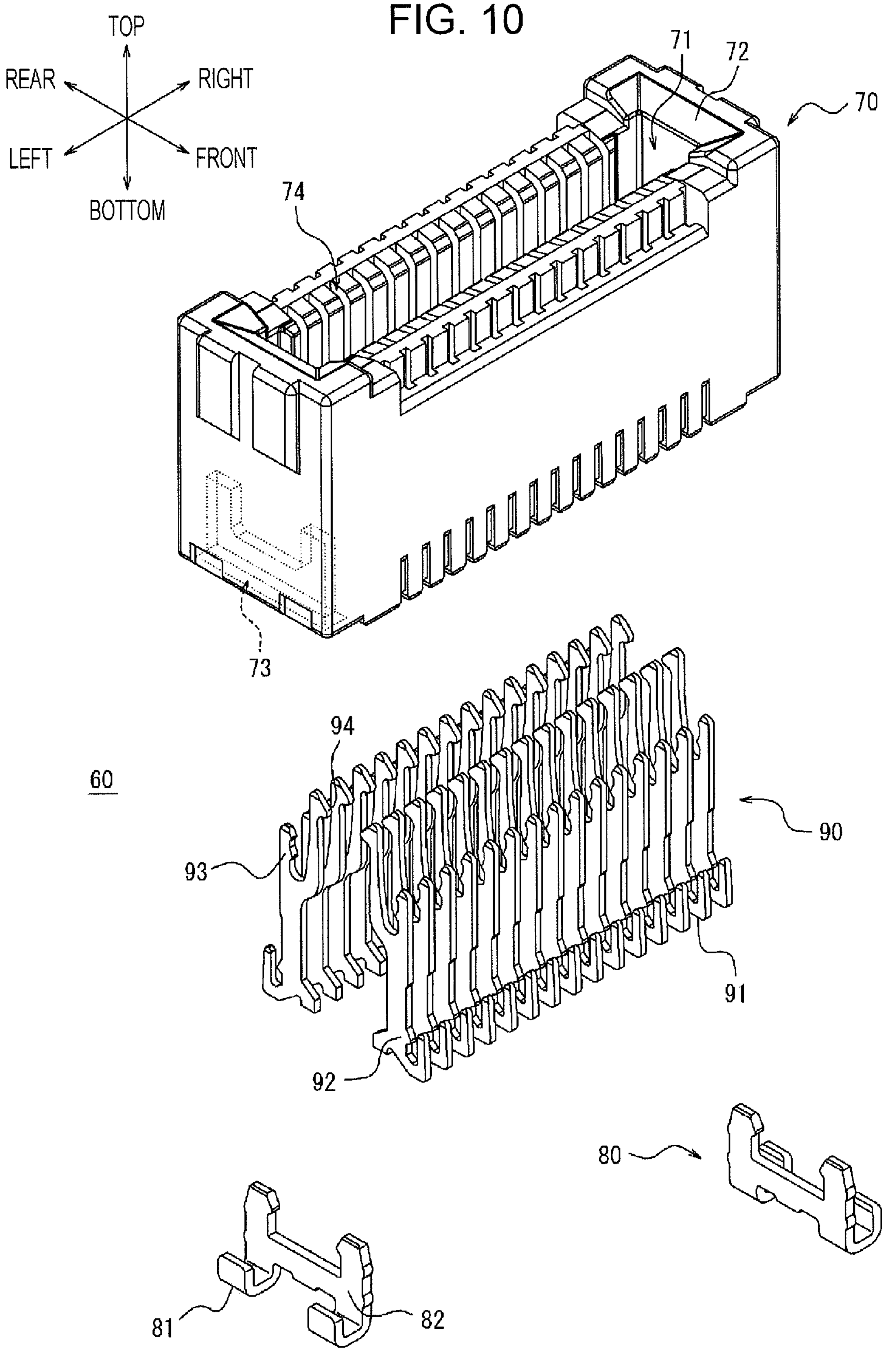
FIG. 10 is an exploded perspective view of the connection target illustrated in FIG. 9 when viewed from the top surface.

As illustrated in FIG. 10, the connection target 60 includes, as its main components, the insulator 70, the metal fittings 80, and the contacts 90. The connection target 60 is assembled by press-fitting the metal fittings 80 and the contacts 90 into the insulator 70 from below.

The insulator 70 is a member formed by injection molding of a synthetic-resin material having an insulating property and heat resistance into a quadrangular columnar shape. A fit recess 71 is formed in the insulator 70 by linearly recessing the top surface of the insulator 70 in the longitudinal direction. The insulator 70 incudes guide portions 72 formed at the upper edges of left and right end portions of the fit recess 71. The guide portions 72 each have an inclined surface inclined obliquely inward and downward at the upper edge of the fit recess 71. Metal-fitting mount grooves 73 are formed in the insulator 70 by recessing right and left portions of the bottom surface of the insulator 70 upward.

Multiple contact mount grooves 74 are formed in the insulator 70, the multiple contact mount grooves 74 being formed in the front and rear sides of a bottom portion of the insulator 70 and in the front and rear surfaces of the fit recess 71. The multiple contact mount grooves 74 are formed in such a manner as to be spaced apart from one another at a predetermined pitch along the longitudinal direction.

Each of the metal fittings 80 is obtained by forming a thin plate made of an arbitrary metal material into the shape illustrated in FIG. 10 by using a progressive die (by stamping). Each of the metal fittings 80 is formed so as to have an H-shape in a front view when viewed in the longitudinal direction. Each of the metal fittings 80 includes a mount portion 81 extending outward from the lower end portion of the metal fitting 80 so as to have a U-shape. Each of the metal fittings 80 includes an engagement portion 82 formed in such a manner as to be contiguous to the mount portion 81 and in such a manner as to extend upward.

Each of the contacts 90 is obtained by forming a thin plate made of a copper alloy containing phosphor bronze, beryllium copper, or titanium copper and has spring elasticity or a Corson copper alloy into the shape illustrated in FIG. 10 by using a progressive die (by stamping). An undercoat is formed on the surface of each of the contacts 90 by nickel plating, and then, gold plating, tin plating, or the like is performed on the undercoat.

The multiple contacts 90 are arranged along the longitudinal direction. Each of the contacts 90 includes a mount portion 91 extending outward. Each of the contacts 90 includes a first engagement portion 92 formed in such a manner as to be contiguous to the mount portion 91. Each of the contacts 90 includes a second engagement portion 93 and an elastic contact portion 94 extending upward from the first engagement portion 92 and branching off from each other. The second engagement portion 93 linearly extends upward from the first engagement portion 92. The elastic contact portion 94 extends upward from the first engagement portion 92 while bending inward in the depth direction.

As illustrated in FIG. 9, the metal fittings 80 are each fitted into one of the metal-fitting mount grooves 73 of the insulator 70. For example, the engagement portions 82 of the metal fittings 80 each engage one of the metal-fitting mount grooves 73 of the insulator 70. The metal fittings 80 are positioned at the left and right ends of the insulator 70. Each of the multiple contacts 90 is fitted in one of the multiple contact mount grooves 74 of the insulator 70. For example, the first engagement portion 92 and the second engagement portion 93 of each of the contacts 90 engage one of the contact mount grooves 74 of the insulator 70. In this case, the ends of the elastic contact portions 94 of the contacts 90 are each exposed inside the fit recess 71 through the corresponding contact mount groove 74 of the insulator 70. The elastic contact portions 94 can be elastically deformed in the depth direction in the contact mount grooves 74.

The connection target 60 having a structure such as that described above is mounted onto, for example, a circuit formation surface included in a mounting surface of the circuit board CB2. More specifically, the mount portions 81 of the metal fittings 80 are each placed onto a solder paste portion formed by applying solder paste to applied to a pattern on the circuit board CB2. The mount portions 91 of the contacts 90 are each placed onto a solder paste portion formed by applying solder paste to the pattern on the circuit board CB2. By heating and melting the solder paste portions in a reflow furnace or the like, the mount portions 81 and the mount portions 91 are soldered to the above-mentioned pattern. As a result, the mounting of the connection target 60 onto the circuit board CB2 is completed. For example, electronic components including a camera module and a sensor other than the connection target 60 are mounted onto the circuit formation surface of the circuit board CB2.

Figure 11:
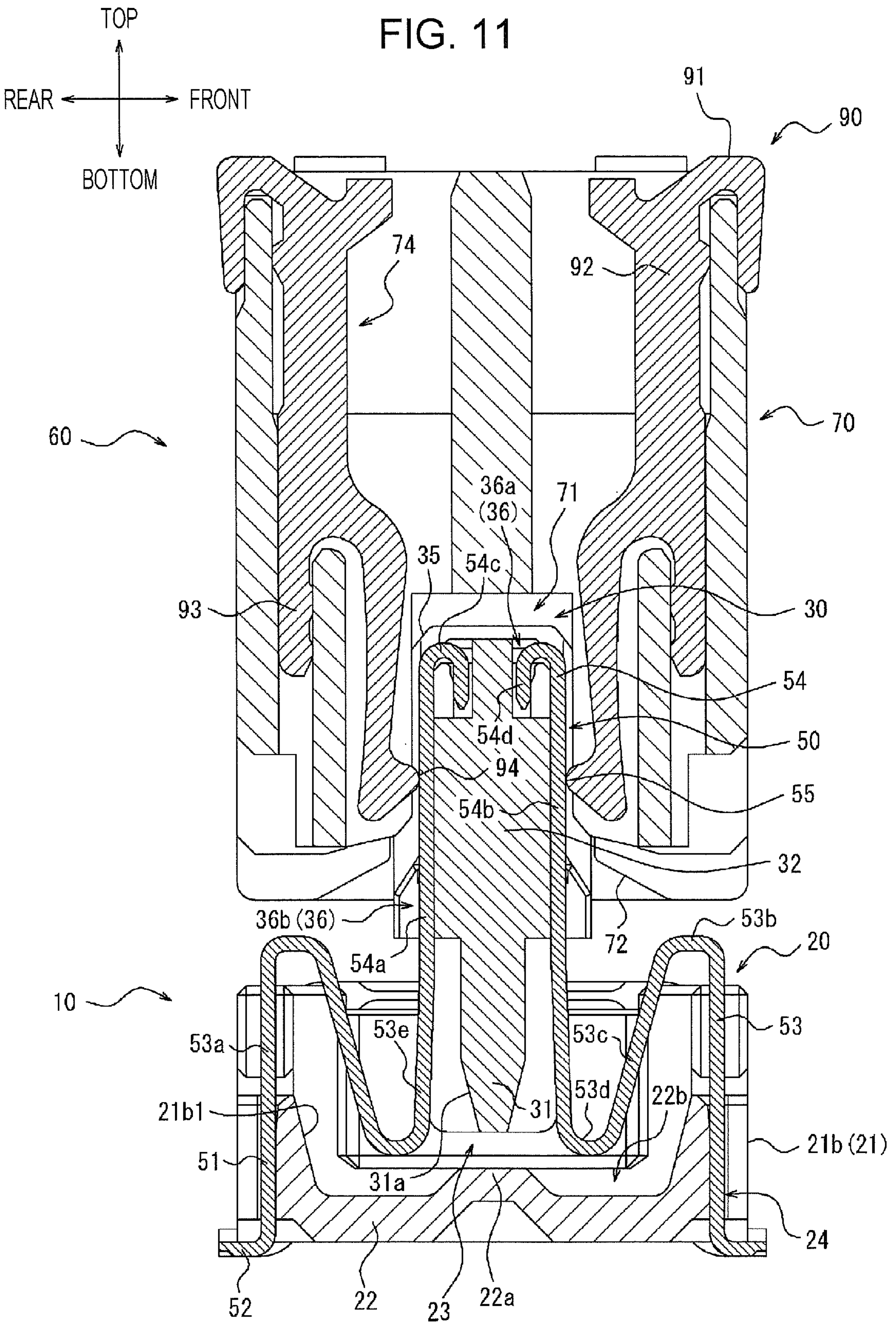
FIG. 11 is a cross-sectional view taken along line XI-XI of FIG. 1.

FIG. 11 is a cross-sectional view taken along line XI-XI of FIG. 1. Operation of the connector 10 having the floating structure will be described with reference mainly to FIG. 11.

The mount portions 52 of the contacts 50 are soldered to the circuit board CB1, so that the first insulator 20 is fixed onto the circuit board CB1. As a result of the elastic portions 53 of the contacts 50 being elastically deformed, the second insulator 30 becomes movable with respect to the first insulator 20 fixed to the circuit board CB1.

As illustrated in FIG. 4 and FIG. 8, the longitudinal walls 21*b* of the first insulator 20 restrict excessive movement of the second insulator 30 in the depth direction with respect to the first insulator 20. For example, when the second insulator 30 moves significantly beyond its designed range in the depth direction in response to elastic deformation of the elastic portions 53 of the contacts 50, the retain protrusions 33 of the second insulator 30 come into contact with the longitudinal walls 21*b*. As a result, the second insulator 30 will not move further outward in the depth direction.

As illustrated in FIG. 8, the lateral walls 21*a* of the first insulator 20 and the protrusions 44 of the metal fittings 40 restrict excessive movement of the second insulator 30 in the longitudinal direction with respect to the first insulator 20. For example, when the second insulator 30 moves significantly beyond its designed range in the longitudinal direction in response to elastic deformation of the elastic portions 53 of the contacts 50, the retain protrusions 33 of the second insulator 30 come into contact with the lateral walls 21*a*. Alternatively, the counter surfaces 34*b* of the second insulator 30 come into contact with the protrusions 44. In this case, in each of the metal fittings 40, a portion of the retain portion 43 and the protrusion 44 are accommodated in one of the clearance spaces 34*c* of the second insulator 30. As a result, the second insulator 30 will not move further outward in the longitudinal direction.

As illustrated in FIG. 7 and FIG. 11, the lower surface of the bottom portion 31 of the second insulator 30 restricts excessive downward movement of the second insulator 30 with respect to the first insulator 20. For example, when the second insulator 30 moves significantly beyond its designed range in the downward direction in response to elastic deformation of the elastic portions 53 of the contacts 50, the lower surface of the bottom portion 31 of the second insulator 30 comes into contact with the upper surface of the contact portion 22*a* of the bottom wall 22. Similarly, the first surfaces 33*a* of the retain protrusions 33 come into contact with the bottom surfaces 22*c* of the bottom wall 22, which are formed so as to be flush with the upper surface of the contact portion 22*a*. As a result, the second insulator 30 will not move further downward. In this case, when the depth h2 of each of the recesses 22*b* is larger than the vertical distance h1 as illustrated in FIG. 7, the second folded portions 53*d* of the contacts 50 do not come into contact with the bottom surfaces of the recesses 22*b* of the first insulator 20. The amount of downward movement of the second insulator 30 in response to elastic deformation of the elastic portions 53 of the contacts 50 is usually different from the amount of downward movement of each of the elastic portions 53.

As illustrated in FIG. 8, the retain portions 43 of the metal fittings 40 reduce the second insulator 30 from coming off the first insulator 20 in the upward direction. The retain portions 43 of the metal fittings 40 restrict excessive upward movement of the second insulator 30 with respect to the first insulator 20. For example, when the second insulator 30 moves significantly beyond its designed range in the upward direction in response to elastic deformation of the elastic portions 53 of the contacts 50, the retain protrusions 33 of the second insulator 30 come into contact with the retain portions 43. As a result, the second insulator 30 will not move further upward. The connector 10 can restrict, with high-strength members such as the metal fittings 40, excessive upward movement of the second insulator 30.

The connector 10 having a floating structure such as that described above and the connection target 60 are positioned such that they face each other in the vertical direction in a state where the connection target 60 is turned upside down with respect to the connector 10 and where their positions in the depth direction and the longitudinal direction substantially aligned with each other. Then, the connection target 60 is moved downward. In this case, even if the connector 10 and the connection target 60 are slightly displaced from each other in, for example, the depth direction or the longitudinal direction, the guide portions 35 of the connector 10 and the guide portions 72 of the connection target 60 come into contact with each other.

As a result, the second insulator 30 is caused to move relative to the first insulator 20 by the floating structure of the connector 10. More specifically, the fit projection 32 of the second insulator 30 is guided into the fit recess 71 of the insulator 70. When the connection target 60 is further moved downward, the fit projection 32 of the second insulator 30 and the fit recess 71 of the insulator 70 are fitted to each other.

As illustrated in FIG. 11, in the fitted state in which the second insulator 30 of the connector 10 and the insulator 70 of the connection target 60 are fitted to each other, the contacts 50 of the connector 10 and the contacts 90 of the connection target 60 are in contact with each other. More specifically, each of the contact portions 55 of the contacts 50 is in contact with one of the elastic contact portions 94 of the contacts 90. In this case, the ends of the elastic contact portions 94 of the contacts 90 are each elastically deformed slightly toward the outside in the depth direction and elastically displaced toward the inside of the corresponding contact mount groove 74.

In the manner described above, the connector 10 and the connection target 60 are completely connected to each other. In this case, the circuit board CB1 and the circuit board CB2 are electrically connected to each other via the contacts 50 and the contacts 90.

In this state, a pair of the elastic contact portions 94, which are included in the elastic contact portions 94 of the contacts 90, sandwich a corresponding pair of the contacts 50 of the connector 10 from both sides of the pair of the contacts 50 in the depth direction with an inward elastic force along the depth direction. As a result, a pressing force is generated and applied to the contacts 50 of the connector 10. Because of this pressing force, when the connection target 60 is extracted from the connector 10, the second insulator 30 receives a force in the direction in which the connection target 60 is extracted from the connector 10, that is, an upward direction, via the contacts 50. Consequently, even if the second insulator 30 moves upward, the retain portions 43 of the metal fittings 40 press-fitted to the first insulator 20 reduce the second insulator 30 from coming off the first insulator 20 in the upward direction.

In the above-described embodiment, the connector 10 allows the second insulator 30 serving as the movable insulator to move in the fitting direction. For example, since the second insulator 30 is disposed inside the first insulator 20 in such a manner as to be spaced apart from the first insulator 20, the second insulator 30 is movable relative to the first insulator 20 not only in the depth direction and the longitudinal direction but also in the fitting direction. For example, in the non-fitted state, the second insulator 30 and the elastic portions 53 of the contacts 50 are separated from the bottom wall 22 of the first insulator 20. Thus, the second insulator 30 is also movable toward the bottom wall 22 side in response to elastic deformation of the elastic portions 53 toward the bottom wall 22 side.

In the non-fitted state, the bottom wall 22 of the first insulator 20 faces the second insulator 30 and the elastic portions 53. The bottom wall 22, in which the recesses 22*b* are formed, is positioned between the circuit board CB1, on which the connector 10 is mounted, and the elastic portions 53. Consequently, even in the case where the second insulator 30 moves toward the bottom wall 22 side and where the circuit board CB1 is disposed perpendicularly to the fitting direction, the connector 10 can reduce its components from coming into contact with the circuit board CB1. The bottom wall 22 is interposed between the second insulator 30 and the elastic portions 53 and the circuit board CB1. Thus, for example, even when the second insulator 30 moves significantly toward the bottom wall 22 side, the connector 10 can reduce its components including the second insulator 30 and the elastic portions 53 from coming into contact with the circuit board CB1. Therefore, problems such as deformation and breakage in the contacts 50 are reduced. As a result, the connector 10 can reduce deterioration of the movable characteristics, which are obtained due to the floating structure. The connector 10 can also reduce an electrical failure, such as a short-circuit, that may occur when at least one of the contacts 50 comes into contact with the circuit board CB1.

Since each of the end portions of the elastic portions 53 of the contacts 50 on the bottom wall 22 side is located further toward the bottom wall 22 side than the end portion of the second insulator 30 on the bottom wall 22 side, the second extension portions 53*c* can be further extended. As a result, the entire elastic portions 53 can be formed longer. Accordingly, the movable amount of the second insulator 30 in a direction parallel to the bottom wall 22, that is, in the depth direction and the longitudinal direction, increases. Therefore, the connector 10 enables smooth movement of the second insulator 30 and can provide a favorable floating structure.

The bottom wall 22 includes the contact portion 22*a* facing the second insulator 30, and thus, the connector 10 can restrict excessive movement of the second insulator 30 toward the bottom wall 22 side with respect to the first insulator 20. Similarly, since the retain protrusions 33 face the bottom surfaces 22*c* of the bottom wall 22 of the first insulator 20, which are formed so as to be flush with the contact portion 22*a*, the connector 10 can restrict excessive movement of the second insulator 30 toward the bottom wall 22 side with respect to the first insulator 20. As a result, the connector 10 can reduce the contacts 50 from coming into contact with the bottom wall 22 due to excessive elastic deformation of the elastic portions 53 of the contacts 50. Therefore, a problem such as breakage of the contacts 50 is reduced.

Since the recesses 22*b* are formed in the bottom wall 22 so as to face the elastic portions 53 of the contacts 50, even when the second insulator 30 moves toward the bottom wall 22 side with respect to the first insulator 20, contact between the elastic portions 53 and the bottom wall 22 is reduced. For example, since the depth h2 of each of the recesses 22*b* is larger than the vertical distance h1 as illustrated in FIG. 7, even if the second insulator 30 moves significantly, contact between the elastic portions 53 and the bottom wall 22 is adequately reduced. As a result, problems such as deformation and breakage of the first insulator 20 that may occur due to contact with the contacts 50 are reduced.

The bottom wall 22 is continuously formed so as to connect the pair of longitudinal walls 21*b* to each other, and this improves the strength of the first insulator 20. The first insulator 20 includes the pair of lateral walls 21*a*, which are perpendicular to the pair of longitudinal walls 21*b* and which forms the outer peripheral wall 21 together with the longitudinal walls 21*b*, and this further improves the strength of the first insulator 20. Accordingly, the connector 10 including the first insulator 20 has improved robustness. Contact between a portion of the circuit board CB1, the portion being covered with the bottom wall 22, and the contacts 50 of the connector 10 is reduced. Thus, a pattern can be formed while this portion is used as a portion of the circuit formation surface.

Since the elastic portions 53 of the contacts 50 each have the shape illustrated in FIG. 7, the movable amount of the second insulator 30 when the second insulator 30 moves with respect to the first insulator 20 can be maintained while the width of the connector 10 in the lateral direction of the connector 10 is reduced. The connector 10 can maintain a movable amount required for the second insulator 30 while a reduction in the size of the connector 10 in the lateral direction of the connector 10 is achieved.

Since the longitudinal walls 21*b* have the inclined surfaces 21*b*1 inclined obliquely downward in such a manner as to face their respective second extension portions 53*c*, the space in which the elastic portions 53 can be elastically deformed in the depth direction is larger than that in the case where, for example, the inner surfaces of the longitudinal walls 21*b* in the depth direction are each vertically formed. Similarly, since the bottom portion 31 of the second insulator 30 has the tapered surfaces 31*a*, the space in which the elastic portions 53 can be elastically deformed in the depth direction is larger than that in the case where, for example, the side surfaces of the bottom portion 31 in the depth direction are each vertically formed. As a result, the movable amount of the second insulator 30 when the second insulator 30 moves in the depth direction increases. Therefore, the connector 10 enables smooth movement of the second insulator 30 and can provide a favorable floating structure.

Since the retain protrusions 33 face the pair of longitudinal walls 21*b* and the pair of lateral walls 21*a*, the connector 10 can restrict excessive movement of the second insulator 30 in the depth direction and the longitudinal direction with respect to the first insulator 20. In the connector 10, even if the entire elastic portions 53 are formed longer and the movable amount of the second insulator 30 in the depth direction and the longitudinal direction increases, excessive movement in the depth direction and the longitudinal direction can be restricted with certainty. As a result, the connector 10 can reduce contact between the contacts 50 and the first insulator 20 due to excessive elastic deformation of the elastic portions 53 of the contacts 50. Therefore, a problem such as breakage of the contacts 50 is reduced.

Since the bottom surfaces of the retain protrusions 33 on the bottom wall 22 side each have the first surface 33*a* and the second surface 33*c*, for example, in FIG. 8, the second insulator 30 can be tilted in the longitudinal direction with respect to the first insulator 20. The connector 10 also allows such tilting of the second insulator 30 along the longitudinal direction of the first insulator 20. Since the first surfaces 33*a* are formed so as to be flush with the portion of the bottom portion 31 facing the contact portion 22*a*, the contact area between the second insulator 30 and the bottom wall 22 increases. Therefore, breakage of the second insulator 30 is reduced.

Since the second insulator 30 includes the guide portions 35, the fit projection 32 of the second insulator 30 may be easily guided into the fit recess 71 of the connection target 60, and a favorable floating structure can be fabricated in the connector 10. The operation of inserting the connection target 60 into the connector 10 is facilitated.

Since the second insulator 30 includes the constricted portions 34, the second insulator 30 can move outward in the longitudinal direction by an amount equal to the clearance spaces 34*c*. As a result, the movable amount of the second insulator 30 when the second insulator 30 moves in the longitudinal direction increases. Therefore, the connector 10 enables smooth movement of the second insulator 30 and can provide a favorable floating structure.

Each of the contacts 50 engages the second insulator 30 at its two portions, which are the second engagement portion 54*a* and the third engagement portion 54*d*, and this improves the retaining force of each of the contacts 50 with respect to the second insulator 30. As a result, the contacts 50 are reduced from coming off the second insulator 30 when the second insulator 30 moves in the vertical direction, the depth direction, or the longitudinal direction.

Since the contacts 50 are made of a metallic material having a low elastic modulus, the connector 10 can maintain a required movable amount of the second insulator 30 even in the case where the force applied to the second insulator 30 is small. The second insulator 30 can move smoothly with respect to the first insulator 20. Therefore, the connector 10 can easily accommodate the positional deviation when the connector 10 is fitted into the connection target 60.

In the connector 10, the elastic portions 53 of the contacts 50 absorb vibration generated by some external factor. Consequently, the probability that a large force will be applied to the mount portions 52 is reduced. Thus, breakage of a portion connected to the circuit board CB1 is reduced. Generation of cracks in the solder used at the portions at which the mount portions 52 are connected to the circuit board CB1 can be reduced. Therefore, even in a state where the connector 10 and the connection target 60 are connected to each other, the improved connection reliability is obtained.

The metal fittings 40 are press-fitted into the first insulator 20, and the mount portions 41 are soldered to the circuit board CB1, so that the metal fittings 40 can stably fix the first insulator 20 onto the circuit board CB1. The metal fittings 40 improve the mounting strength of the first insulator 20 with respect to the circuit board CB1.

It is obvious to those skilled in the art that the present disclosure can be embodied in other specific forms other than the above-described embodiment without departing from the spirit thereof or the essential features thereof. Thus, the above description is illustrative, and the present disclosure is not limited to the above description. The scope of the disclosure is defined not by the above description but by the appended claims. Among all possible changes, some changes that are within the range of equivalents of the present disclosure are encompassed within the scope of the present disclosure.

For example, the shape, the arrangement, the orientation, and the number of the components described above are not limited to those illustrated in the above description and the drawings. The shape, the arrangement, the orientation, and the number of the components may be arbitrarily set as long as the functions of the components can be implemented.

The method of assembling the connector 10 and the method of assembling the connection target 60 are not limited to those described above. Any methods may be used as the method of assembling the connector 10 and the method of assembling the connection target 60 as long as the connector 10 and the connection target 60 can be assembled such that they exhibit their functions. For example, at least one of the metal fittings 40 or the contacts 50 may be integrally formed with at least one of the first insulator 20 or the second insulator 30 by insert molding rather than press-fitting. For example, at least one of the metal fittings 80 or the contacts 90 may be integrally formed with the insulator 70 by insert molding rather than press-fitting.

In the above-described embodiment, although the end portions of the elastic portions 53 on the bottom wall 22 side are located further toward the bottom wall 22 side than the end portion of the second insulator 30 on the bottom wall 22 side, the present disclosure is not limited to this configuration. As long as a movable amount required for the second insulator 30 can be obtained, the end portions of the elastic portions 53 on the bottom wall 22 side may be located further toward the side opposite to the bottom wall 22 side than the end portion of the second insulator 30 on the bottom wall 22 side.

In the above-described embodiment, although the bottom wall 22 includes the contact portion 22*a* facing the second insulator 30, the present disclosure is not limited to this configuration. The connector 10 does not need to include the contact portion 22*a* as long as the connector 10 can restrict excessive movement of the second insulator 30 toward the bottom wall 22 side with respect to the first insulator 20.

In the above-described embodiment, although the recesses 22*b* are formed in the bottom wall 22 so as to face the elastic portions 53 of the contacts 50, the present disclosure is not limited to this configuration. The connector 10 does not need to include the recesses 22*b* as long as the contact between the elastic portions 53 and the bottom wall 22 is reduced.

In the above-described embodiment, although the bottom wall 22 is continuously formed so as to connect the pair of longitudinal walls 21*b*, the present disclosure is not limited to this configuration. The bottom wall 22 does not need to be continuously formed. For example, a portion of the bottom wall 22 may be cut out all the way in the vertical direction, Or a through hole may be formed in a portion of the bottom wall 22. Similarly, the bottom surface of each of the recesses 22*b* does not need to be continuously formed. For example, a portion of the bottom surface of each of the recesses 22*b* may be cut out all the way in the vertical direction, or a through hole may be formed in a portion of the bottom surface of each of the recesses 22*b*.

In the above-described embodiment, although the longitudinal walls 21*b* have the inclined surfaces 21*b*1 inclined obliquely downward in such a manner as to face their respective second extension portions 53*c* of the contacts 50, the present disclosure is not limited to this configuration. The connector 10 does not need to have the inclined surfaces 21*b*1 as long as a space in which the elastic portions 53 can be elastically deformed in the depth direction is ensured. Similarly, in the above-described embodiment, although the bottom portion 31 has the tapered surfaces 31*a*, the present disclosure is not limited to this configuration. The connector 10 does not need to have the tapered surfaces 31*a* as long as a space in which the elastic portions 53 can be elastically deformed in the depth direction is ensured.

In the above-described embodiment, although the first insulator 20 includes the pair of lateral walls 21*a* perpendicular to the pair of longitudinal walls 21*b* and forming the outer peripheral wall 21 together with the longitudinal walls 21*b*, the present disclosure is not limited to this configuration. The first insulator 20 does not need to include the pair of lateral walls 21*a*.

In the above-described embodiment, although the bottom surfaces of the retain protrusions 33 on the bottom wall 22 side have the first surfaces 33*a*, the inclined surfaces 33*b*, and the second surfaces 33*c*, the present disclosure is not limited to this configuration. The bottom surfaces of the retain protrusions 33 on the bottom wall 22 side may each be formed as a single flat surface. Alternatively, a protrusion or the like may be provided on each of the bottom surfaces of the retain protrusions 33 on the bottom wall 22 side such that the protrusions partially comes into contact with the bottom wall 22. The first surfaces 33*a* do not need to be formed so as to be flush with the portion of the bottom portion 31 facing the contact portion 22*a*. Similar to the second insulator 30, the bottom surfaces 22*c* of the first insulator 20 do not need to be formed so as to be flush with the contact surface of the contact portion 22*a*.

Although it has been described above that the contacts 50 are made of a metallic material having a low elastic modulus, the present disclosure is not limited to this configuration. The contacts 50 may be made of a metallic material having any elastic modulus as long as a required amount of elastic deformation can be ensured.

Although it has been described above that the connection target 60 is a receptacle connector connected to the circuit board CB2, the present disclosure is not limited to this case. The connection target 60 may be any target object other than a connector. For example, the connection target 60 may be an FPC, a flexible flat cable, a rigid substrate, or a card edge of any circuit board.

The connector 10 such as that described above is mounted onto an electronic device. Examples of the electronic device include in-vehicle devices such as a camera, a radar, a dashboard camera, and an engine control unit. Examples of the electronic device also include in-vehicle devices used in vehicle-installed systems, such as a car navigation system, an advanced driver-assistance system and a security system. Examples of the electronic device also include information apparatuses such as a personal computer, a smartphone, a copying machine, a printer, a facsimile machine, and a multifunction machine. Examples of the electronic device also include other industrial apparatuses.

Such an electronic device can reduce deterioration of the movable characteristics, which are obtained due to the floating structure, and occurrence of an electrical failure in the circuit board CB1 while allowing the second insulator 30 serving as a movable insulator in the connector 10 having the floating structure to move in the fitting direction. For example, contact between the contacts 50 of the connector 10 and the circuit board CB1 can be reduced. Consequently, problems such as deformation and breakage in the contacts 50 are reduced. Therefore, the electronic device including the connector 10 can have improved reliability as a product.

The favorable floating structure of the connector 10 accommodates the positional deviation between circuit boards, and this improves the efficiency of assembly of the electronic device. Accordingly, manufacture of the electronic device is facilitated. Since the connector 10 reduces breakage of the portion connected to the circuit board CB1, the electronic device can have further improved reliability as a product.

REFERENCE SIGNS

10 connector
20 first insulator
21 outer peripheral wall
21*a* lateral wall (second side wall)
21*b* longitudinal wall (first side wall)
21*b*1 inclined surface
22 bottom wall
22*a* contact portion
22*b* recess
22*c* bottom surface
23 movable space
24 contact mount groove
25 metal-fitting mount groove
30 second insulator

31 bottom portion
31*a* tapered surface
32 fit projection
33 retain protrusion
33*a* first surface
33*b* inclined surface
33*c* second surface
34 constricted portion
34*a* tapered surface
34*b* counter surface
34*c* clearance space
35 guide portion
36 contact mount groove
36*a* first engagement portion
36*b* second engagement portion
40 metal fitting
41 mount portion
42 engagement portion
43 retain portion
44 protrusion
45 contact
51 first engagement portion
52 mount portion
53 elastic portion
53*a* first extension portion
53*b* first folded portion
53*c* second extension portion
53*d* second folded portion
53*e* third extension portion
54 supported portion
54*a* second engagement portion
54*b* fourth extension portion
54*c* third folded portion
54*d* third engagement portion
55 contact portion
60 connection target
70 insulator
71 fit recess
72 guide portion
73 metal-fitting mount groove
74 contact mount groove
80 metal fitting
81 mount portion
82 engagement portion
90 contact
91 mount portion
92 first engagement portion
93 second engagement portion
94 elastic contact portion
CB1, CB2 circuit board

The invention claimed is:

1. A connector comprising:

a first insulator formed in a rectangular shape and comprising a pair of first side walls and a bottom wall;

a second insulator extending along a longitudinal direction of the first insulator, the second insulator being partially positioned in a space surrounded by the pair of first side walls and the bottom wall and being movable relative to the first insulator; and a contact mounted on the first side walls of the first insulator and on the second insulator and comprising an elastic portion, the elastic portion being located between the first insulator and the second insulator and connecting the first insulator and the second insulator to each other, wherein the second insulator and the elastic portion are spaced apart from the first insulator and face the bottom wall in a non-fitted state in which the second insulator and a connection target are not fitted to each other, and wherein an end portion of the elastic portion on the bottom wall side is located closer to the bottom wall side than an end portion of the second insulator on the bottom wall side, the bottom wall comprises a contact portion facing the second insulator, the second insulator comprises a bottom portion positioned in the space of the first insulator and facing the contact portion, and a retain protrusion formed at an end portion of the bottom portion in the longitudinal direction of the first insulator, a bottom surface of the retain protrusion on the bottom wall side has a first surface formed on the same surface as a portion of the bottom portion facing the contact portion, and a second surface located on a side opposite to the bottom wall with respect to the first surface and substantially parallel to the first surface.

2. The connector according to claim 1, wherein the bottom wall comprises:

a recess formed by recessing the bottom wall further toward a side opposite to another side on which the second insulator is present than a contact surface of the contact portion, the contact surface facing the second insulator.

3. The connector according to claim 2, wherein the recess is formed between the first side walls and the contact portion and faces the elastic portion.

4. The connector according to claim 2, wherein a bottom surface of the recess is continuously formed, and wherein the recess is positioned between a circuit board on which the connector is mounted and the elastic portion.

5. The connector according to claim 2, wherein a depth of the recess is larger than a distance between an end portion of the second insulator on the bottom wall side and an end portion of the elastic portion on the bottom wall side in a fitting direction in which the second insulator and the connection target are fitted to each other.

6. The connector according to claim 1, wherein the elastic portion comprises a first extension portion extending upward on the first insulator side, a first folded portion extending from the first extension portion and folded back in an inverted U-shape, a second extension portion extending obliquely downward from the first folded portion toward the second insulator, a second folded portion extending from the second extension portion and folded back in a U-shape, and a third extension portion extending upward from the second folded portion to the second insulator.

7. The connector according to claim 1, wherein the first insulator comprises a pair of second side walls perpendicular to the pair of first side walls and forming an outer peripheral wall together with the first side walls, and wherein the retain protrusion faces the pair of first side walls and the pair of second side walls in the non-fitted state.

8. The connector according to claim 1, wherein the retain protrusion faces a bottom surface of the bottom wall of the first insulator, the bottom surface being flush with the contact portion, in the non-fitted state.

9. The connector according to claim 1, wherein the first surface of the bottom surface of the retain protrusion is flush with the portion of the bottom portion.

10. An electronic device comprising:

the connector according to claim 1.

11. The connector according to claim 1, wherein the second surface of the bottom surface of the retain protrusion is disposed outward of the first surface in the longitudinal direction.

12. The connector according to claim 1, wherein the second surface of the bottom surface of the retain protrusion is disposed further away from the bottom wall than the first surface.

13. The connector according to claim 1, wherein a height of the pair of first side walls of the first insulator is less than a height of the elastic portion of the contact.

14. The connector according to claim 1, wherein each of the pair of first side walls of the first insulator comprises an inclined surface facing an inclined extension of the elastic portion of the contact, the inclined surface oriented approximately parallel to the inclined extension of the elastic portion.

* * * * *